United States Patent
Tokoro et al.

(10) Patent No.: US 7,858,184 B2
(45) Date of Patent: Dec. 28, 2010

(54) FINE, TIO$_2$-BASED TITANIUM OXIDE-COATED METAL PARTICLES AND THEIR PRODUCTION METHOD

(75) Inventors: Hisato Tokoro, Fukaya (JP); Shigeo Fujii, Kumagaya (JP)

(73) Assignee: Hitachi Metals, Ltd., Tokyo (JP)

( * ) Notice: Subject to any disclaimer, the term of this patent is extended or adjusted under 35 U.S.C. 154(b) by 611 days.

(21) Appl. No.: 11/909,237

(22) PCT Filed: Mar. 15, 2006

(86) PCT No.: PCT/JP2006/305163

§ 371 (c)(1),
(2), (4) Date: Sep. 20, 2007

(87) PCT Pub. No.: WO2006/100986

PCT Pub. Date: Sep. 28, 2006

(65) Prior Publication Data

US 2009/0057605 A1    Mar. 5, 2009

(30) Foreign Application Priority Data

Mar. 22, 2005 (JP) .................. 2005-082341
Aug. 5, 2005 (JP) .................. 2005-228027

(51) Int. Cl.
*B32B 5/16* (2006.01)
*B05D 3/02* (2006.01)
*B05D 3/10* (2006.01)
*B05D 7/00* (2006.01)

(52) U.S. Cl. .................. 428/403; 427/216; 427/217; 427/226; 427/227; 427/337; 427/343; 427/372.2

(58) Field of Classification Search ................. 428/403; 427/216, 217, 226, 227, 337, 343, 372.2
See application file for complete search history.

(56) References Cited

U.S. PATENT DOCUMENTS

| | | | |
|---|---|---|---|
| 4,675,251 A * | 6/1987 | Matijevic et al. ............ 428/404 |
| 5,489,449 A * | 2/1996 | Umeya et al. ................ 427/450 |
| 5,763,085 A | 6/1998 | Atarashi et al. |
| 6,582,763 B1 * | 6/2003 | Nishimura et al. .......... 427/216 |
| 2010/0047579 A1* | 2/2010 | Tokoro et al. ................ 428/403 |

FOREIGN PATENT DOCUMENTS

| JP | 09-143502 | 6/1997 |
|---|---|---|
| JP | 10-153116 A | 6/1998 |
| JP | 2000-030920 A | 1/2000 |
| JP | 2005-120470 A | 5/2005 |

OTHER PUBLICATIONS

Online machine translation of JP 2005-120,470, May 2005.*

(Continued)

*Primary Examiner*—H. (Holly) T Le
(74) *Attorney, Agent, or Firm*—Sughrue Mion, PLLC (57) ABSTRACT

A method for producing fine, coated metal particles comprising the steps of mixing Ti-containing powder except for Ti oxide powder with oxide powder of a metal M, an M oxide having a standard free energy of formation meeting the relation of $\Delta G_{M\text{-}O} > \Delta G_{TiO_2}$; and heat-treating the resultant mixed powder at a temperature of 650-900° C. in a non-oxidizing atmosphere, thereby reducing the oxide of the metal M with Ti to provide the resultant fine particles of the metal M with TiO$_2$-based titanium oxide coating.

20 Claims, 5 Drawing Sheets

OTHER PUBLICATIONS

Takeo Oku, et al; Formation, atomic structures and properties of boron nitride and carbon nanocage fullerene materials; International Journal of Inorganic Materials 3 (2001) 597-612.

Hyun-Min Kim, et al; Apatite-Forming Ability of Alkali-Treated Ti Metal in Body Environment; Journal of the Ceramic Society of Japan; 105[2] 111-116 (1997).

* cited by examiner

FINE, TIO$_2$-BASED TITANIUM OXIDE-COATED METAL PARTICLES AND THEIR PRODUCTION METHOD

FIELD OF THE INVENTION

The present invention relates to coated, magnetic metal particles usable for magnetic recording media such as magnetic tapes, magnetic recording disks, etc.; electromagnetic-wave absorbers; electronic devices (soft magnetic bodies such as yokes) such as inductors, printed circuit boards, etc.; photo-catalysts, magnetic beads for extracting nucleic acids; medical microspheres, etc., and their production method.

BACKGROUND OF THE INVENTION

As electronic equipment has become higher in performance and smaller in size and weight, electronic devices have become higher in performance and smaller in size and weight, requiring materials forming electronic devices to have higher performance and as small size as a nano level. For instance, magnetic particles coated on magnetic tapes are required to have as small size as a nano level and improved magnetization to achieve a higher magnetic recording density.

Magnetic nano-particles are mainly produced by liquid-phase synthesis methods such as a coprecipitation method, a hydrothermal synthesis method, etc. Magnetic nano-particles obtained by the liquid-phase methods are oxide particles such as ferrite, magnetite, etc. Recently, methods utilizing the thermal decomposition of organometallic compounds are used to produce, for instance, Fe nano-particles from Fe(CO)$_5$.

Because metals are more magnetized than oxide-type magnetic particles, metal particles are expected to be used in industrial applications. For instance, metal Fe has saturation magnetization of 218 A·m$^2$/kg, much larger than that of iron oxides. Accordingly, the metal Fe has excellent magnetic response, enabling larger signal intensity. However, metal particles such as the metal Fe, etc. are easily oxidized. For instance, when metals are formed into fine particles of 100 μm or less, particularly 1 μm or less, they tend to be vigorously burned in the air because of increased specific surface areas, resulting in difficulty in handling in a dry state. Accordingly, oxide particles such as ferrite, magnetite, etc. have widely been used.

In handling dry metal particles, it is indispensable that the metal particles are coated lest that they are in direct contact with air (oxygen). However, surface-coating with metal oxides results in appreciable oxidation of metals (JP 2000-30920 A).

JP 9-143502A proposes a method for producing graphite-coated metal particles comprising the steps of mixing carbonaceous particles such as carbon black, natural graphite, etc. with simple metal particles or metal compound particles such as metal oxides, metal carbides, metal salts, etc., heating them at 1600-2800° C. in an inert gas atmosphere, and cooling them at a speed of 45° C./minute or less. However, because metal-containing particles are heat-treated at extremely high temperature of 1600-2800° C. in this method, metal particles are likely sintered. In addition, the coating of metal particles with graphite disadvantageously suffers low productivity.

Known as a coating method free from this problem is the coating of metal particles with boron nitride (BN) [see, for instance, International Journal of Inorganic Materials 3, p. 597 (2001)]. BN is a material used for crucibles, etc., having as high a melting point as 3000° C., excellent thermal stability, low reactivity with metals, and insulation. Methods of coating metal particles with BN include (1) a method of heating a mixture of metal particles and B particles in a nitrogen atmosphere by arc discharge; (2) a method of heating a mixture of metal particles and B particles in a mixed atmosphere of hydrogen and ammonia; and (3) a method of heat-treating a mixture of metal nitrate, urea and boric acid in a hydrogen atmosphere. Particularly the methods (2) and (3) are expected to avoid the sintering of metal particles, because heating is conducted at as low temperature as 1000° C. However, BN-coated metal particles are extremely expensive.

In addition, because graphite has a structure in which graphene sheets are laminated, graphite covering spherical metal particles inevitably has lattice defects. Boron nitride similarly has a laminated structure, failing to provide a completely crystalline coating layer. Coatings having these defects are unsatisfactory in applications needing high corrosion resistance, such as magnetic beads, etc. Accordingly, fine metal particles having high corrosion resistance, and a method for producing such fine metal particles with excellent industrial productivity at low cost are desired.

OBJECTS OF THE INVENTION

Accordingly, an object of the present invention is to provide fine, coated metal particles with excellent corrosion resistance, and a method for producing such fine, coated metal particles at low cost.

DISCLOSURE OF THE INVENTION

The method of the present invention for producing fine, coated metal particles comprises the steps of mixing Ti-containing powder except for Ti oxide powder with oxide powder of a metal M, an M oxide having a standard free energy of formation meeting the relation of $\Delta G_{M\text{-}O} > \Delta G_{TiO2}$; and heat-treating the resultant mixed powder at a temperature of 650-900° C. in a non-oxidizing atmosphere, thereby reducing the oxide of the metal M with Ti to provide the resultant fine particles of the metal M with TiO$_2$-based titanium oxide coating.

The fine, coated metal particles of the present invention comprises fine particles of a metal M coated with TiO$_2$-based titanium oxide, an M oxide having standard free energy of formation meeting the relation of $\Delta G_{M\text{-}O} > \Delta G_{TiO2}$, the maximum peak of TiO$_2$ having a half-width of 0.3° or less in an X-ray diffraction pattern of the fine, coated metal particles, and the intensity ratio of the maximum peak of TiO$_2$ to the maximum peak of the metal M being 0.03 or more. The maximum peak intensity ratio is preferably 0.05 or more.

Using oxide powder of the metal M, whose oxide has standard free energy of formation $\Delta G_{M\text{-}O}$ larger than the standard free energy of formation $\Delta G_{TiO2}$ of TiO$_2$ in the heat treatment, the oxide powder of the metal M is reduced by Ti, and a TiO$_2$-based titanium oxide coating is formed. A TiO$_2$-based titanium oxide coating layer has high crystallinity, sufficiently protecting fine metal core particles. The term "TiO$_2$-based" used herein means that among diffraction peaks corresponding to all kinds of Ti oxide phases including other Ti oxides (for instance, Ti$_n$O$_{2n-1}$ having nonstoichiometric compositions) than TiO$_2$, which are detected by X-ray diffraction measurement, the peak of the TiO$_2$ phase has the maximum intensity. From the aspect of uniformity, the titanium oxide is preferably substantially composed of TiO$_2$ only. The term "substantially composed of TiO$_2$" used herein means that the percentage of TiO$_2$ is so large that peaks of other Ti oxides than TiO$_2$ are not clearly discernible in the X-ray diffraction pattern. Accordingly, even if there were peaks of other Ti oxides than $TiO_2$ at a noise level in the X-ray diffraction pattern, the condition of "substantially composed of $TiO_2$" would be met.

Because metal particles and coating layers are formed simultaneously in a step at low temperatures in the method of the present invention, the fine, coated metal particles can be produced extremely easily at high productivity while preventing oxidation.

The metal M is preferably Fe. Because Ti is smaller than Fe in the standard energy forming oxide, the Fe oxide can be reduced efficiently and surely. Accordingly, fine, magnetic metal particles with high saturation magnetization and excellent corrosion resistance can be obtained.

The metal M oxide is preferably $Fe_2O_3$, and the Ti-containing powder is preferably TiC. To obtain fine, coated metal particles with reduced coercivity and improved dispersibility, the percentage of the Ti-containing powder to the total of the oxide powder of the metal M and the Ti-containing powder is preferably 30-50% by mass.

The fine, coated metal particles are preferably further immersed in an aqueous alkali solution, and then dried. This alkali treatment provides the fine, coated metal particles with improved corrosion resistance.

To obtain fine, magnetic metal particles having excellent corrosion resistance, the metal M should be a magnetic metal, and is preferably Fe having high saturation magnetization. With the magnetic metal as a core, the fine, coated metal particles are easily usable in a magnetic separation process, and can be used for purifying themselves, and magnetic beads.

The fine, coated metal particles preferably have saturation magnetization of 50-180 $A \cdot m^2/kg$ to obtain coated, magnetic metal particles having excellent corrosion resistance and magnetic properties, with good volume balance between coating layers and magnetic layers. The saturation magnetization of the fine, coated metal particles is more preferably 95-180 $A \cdot m^2/kg$. The range of 95-180 $A \cdot m^2/kg$ for exhibiting excellent magnetic separation performance cannot be achieved by oxide-type magnetic materials such as magnetite, etc.

The fine, coated metal particles preferably have coercivity of 8 kA/m or less, so that they constitute coated, magnetic metal particles having extremely small residual magnetization, and extremely reduced magnetic agglomeration, resulting in excellent dispersibility. The more preferred coercivity is 4 kA/m or less.

The fine, coated metal particles preferably comprises pluralities of fine Fe particles having an average particle size of 1 μm or less, which are embedded in $TiO_2$-based titanium oxide layers. Because fine Fe particles are as small as having an average particle size of 1 μm or less, pluralities of them are sufficiently coated with $TiO_2$. With this structure, the particle sizes of the coated particles can be made larger while keeping high corrosion resistance.

After 2.5 parts by mass of the fine, coated metal particles are immersed in 100 parts by mass of a normal physiological saline solution for 72 hours, the amount of Fe ion eluted is preferably 0.1 ppm or less. The fine, magnetic metal particles with excellent corrosion resistance are not deteriorated during use, thereby being suitable particularly for biochemical and medical applications such as magnetic beads for extracting nucleic acids, etc. The immersion temperature is 25° C.

After $0.2 \times 10^5$ human prostate cancer cells (PC-3 cells) are added to 0.05 mL of a physiological phosphate-buffered saline solution (phosphate-buffered saline, PBS) containing 2 mg/mL of fine, coated metal particles and incubated at 37° C. for 72 hours in air containing 5% of $CO_2$, the number of cells is preferably 50% or more of that when incubated without adding the fine, coated metal particles. Because the chemically active metal is coated with Ti oxide in the fine, coated metal particles with excellent magnetic separation performance to suppress influence on cells, the fine, coated metal particles can be used in biochemical and medical applications.

The fine, coated metal particles preferably have an average particle size d50 of 0.1-10 μm. When the average particle size d50 is 10 μm or less, high dispersibility is obtained in a liquid. On the other hand, when the average particle size d50 is less than 0.1 μm, the coating layer per se is too thin, providing the fine, coated metal particles with small corrosion resistance. The average particle size d50 is more preferably 0.1-6 μm. The average particle size d50 is measured by a wet-type particle size meter utilizing laser diffraction.

A ratio D/d50 of the average particle size D of the fine metal particles to the average particle size d50 of the fine, coated metal particles is preferably 0.5 or less. This provides enough thickness to the Ti oxide coating layer, resulting in improved corrosion resistance.

The fine, coated metal particles preferably have Ti oxide wires on the surface, to provide the fine, coated metal particles with increased specific surface area, thereby improving their ability of absorption.

When the metal M is Fe, the amount of Fe ion eluted is preferably 100 mg/L or less, after 25 mg of the fine, coated metal particles are immersed in 1 mL of an aqueous guanidine hydrochloride solution at a concentration of 6 M at 25° C. for 24 hours. The fine, coated metal particles having high corrosion resistance even at a high chaotropic salt concentration are suitable for DNA extraction, etc.

DESCRIPTION OF THE BEST MODE OF THE INVENTION

[1] Production Method of Fine, Coated Metal Particles

By mixing the oxide powder of the metal M (the standard free energy of formation of an M oxide meets the relation of $\Delta G_{M-O} > \Delta G_{TiO2}$) with Ti-containing powder except for Ti oxide powder, and heat-treating the resultant mixed powder in a non-oxidizing atmosphere, the oxide of the metal M is reduced by Ti, and the resultant fine particles of the metal M are coated with $TiO_2$-based titanium oxide.

(1) Starting Material Powder (a) Oxide Powder of Metal M

The particle size of the oxide powder of the metal M is preferably in a range of 0.001-5 μm, though it may be selected depending on the target particle size of the fine, coated metal particles. When the particle size is less than 0.001 μm, the metal oxide powder is not only too bulky but also subjected to excessive secondary agglomeration, resulting in difficulty in handling in subsequent production steps. When the particle size exceeds 5 μm, the metal oxide powder has too small a specific surface area, resulting in a slow reduction reaction. The practical particle size of the metal oxide powder is 0.005-1 μm. The metal M may be selected from transition metals, precious metals and rare earth metals, but it is preferably Fe, Co, Ni or their alloys for magnetic applications, and its oxides include $Fe_2O_3$, $Fe_3O_4$, CoO, $Co_3O_4$, NiO, etc. Fe is particularly preferable because of high saturation magnetization, and its oxide is preferably $Fe_2O_3$ because of low price. Because the standard energy of formation of Ti oxide is lower than that of Fe oxide, Ti can efficiently and surely reduce Fe oxide.

As long as its oxide has standard free energy of formation meeting the relation of $\Delta G_{M-O} > \Delta G_{TiO2}$, the oxide of the metal M can be reduced by Ti-containing non-oxide powder. $\Delta G_{M-O}$ represents the standard energy of formation of the oxide of the metal M, and $\Delta G_{TiO2}$ (−889 kJ/mol) represents the standard energy of formation of Ti oxide. For instance, $Fe_2O_3$ can be reduced by the Ti-containing non-oxide powder, because $Fe_2O_3$ ($\Delta G_{Fe2O3}$=−740 kJ/mol) meets $\Delta G_{Fe2O3} > \Delta G_{TiO2}$. The fine metal particles coated with $TiO_2$ have a reduced specific gravity and improved dispersibility. Further, because $TiO_2$ is hydrophilic, the fine, $TiO_2$-coated metal particles are suitably dispersed in water, for instance, when used for magnetic beads.

(b) Ti-Containing Powder

The Ti-containing powder is pure Ti powder, powder of a Ti compound Ti—X, wherein X represents an element whose oxide has a larger standard free energy of formation $\Delta G_{X-O}$ than the standard free energy of formation $\Delta G_{TiO2}$ of $TiO_2$, or powder of their mixtures. Specifically, X may be at least one selected from the group consisting of Ag, Au, B, Bi, C, Cu, Cs, Cd, Ge, Ga, Hg, K, N, Na, Pd, Pt, Rb, Rh, S, Sn, Tl, Te and Zn. Because the Ti oxide does not function as a reducing agent, it is not included in the Ti-containing powder. In the case of the element X meeting $\Delta G_{X-O} < \Delta G_{TiO2}$, the element X functions as a reducing agent, failing to form Ti oxide. As long as Ti is contained in an enough amount to reduce the M oxide, the X content is not particularly restricted. The Ti—X is preferably TiC, because TiC is unlikely to form other phases than $TiO_2$ by reaction.

To conduct the reduction reaction efficiently, the Ti-containing non-oxide powder preferably has a particle size of 0.01-20 μm. When the particle size is less than 0.01 μm, the Ti-containing non-oxide powder is likely oxidized in the air, resulting in difficulty in handling. When the particle size exceeds 20 μm, the Ti-containing non-oxide powder has a small specific surface area, resulting in a slow reduction reaction. Particularly with a particle size of 0.1-5 μm, the reduction reaction proceeds sufficiently while suppressing oxidation in the air.

(2) Reduction Reaction

The Ti-containing powder is preferably at least at a stoichiometric ratio to the M oxide powder in the reduction reaction. With insufficient Ti, the M oxide powder would be sintered to bulk during heat treatment. For instance, in the case of a combination of $Fe_2O_3$ and TiC, TiC is preferably 25% by mass or more to $Fe_2O_3$+TiC. When TiC is less than 25% by mass, the reduction of $Fe_2O_3$ with TiC is insufficient. On the other hand, with too high a ratio of TiC and thus too low a ratio of Fe, the resultant fine, $TiO_2$-coated Fe particles have low saturation magnetization and high coercivity. Accordingly, the upper limit of TiC is preferably 50% by mass. The ratio of TiC to $Fe_2O_3$+TiC is more preferably 30-50% by mass, most preferably 30-40% by mass, particularly 30-35% by mass. The coercivity reaches 6 kA/m, 10 kA/m and 15 kA/m, when TiC becomes 35% by mass, 40% by mass and 50% by mass, respectively. The mixing of the M oxide powder and the Ti-containing non-oxide powder uses a mixer such as a mortar, a stirrer, a V mixer, a ball mill, a vibration mill, etc.

The mixed powder of the M oxide powder and the Ti-containing powder except for Ti oxide powder is heat-treated in a non-oxidizing atmosphere to cause a reduction reaction of the M oxide powder with the Ti-containing powder, thereby forming particles of the metal M coated with the $TiO_2$-based titanium oxide. The heat treatment atmosphere is preferably non-oxidizing. The non-oxidizing atmosphere includes inert gases such as Ar, He, etc., and $N_2$, $CO_2$, $NH_3$, etc., though not restrictive. The heat treatment temperature is preferably 650-900° C. When it is lower than 650° C., the reduction reaction does not sufficiently proceed. When it exceeds 900° C., $Ti_nO_{2n-1}$ with a nonstoichiometric composition is mainly formed. $Ti_nO_{2n-1}$ is formed when the metal M takes oxygen from $TiO_2$ at higher than 900° C., or when $TiO_2$ emits oxygen to the non-oxidizing atmosphere, resulting in insufficient reduction of the metal M or an incomplete coating layer. When the heat treatment temperature is 650-900° C., a highly uniform coating substantially made of $TiO_2$ with little defects can be formed. The $TiO_2$ coating is suitable for fine, coated metal particles for photo-catalysts.

(3) Alkali Treatment

To remove metals such as Fe, etc. from the surface thereby improving corrosion resistance, the fine, coated metal particles are preferably treated with alkali. In the case of Fe, for instance, the alkali treatment reduces the amount of Fe ion eluted to 100 mg/L or less, after the 25 mg of fine, coated metal particles are immersed in 1 mL of an aqueous guanidine hydrochloride solution at a concentration of 6 M at 25° C. for 24 hours.

An alkali source for the alkali treatment need only be a compound which exhibits alkalinity in an aqueous solution, including NaOH, KOH, alkaline surfactants, etc. Using a ball mill, etc., the alkali treatment may be conducted by immersing the fine, coated metal particles in an aqueous solution containing the alkali source, and stirring. When the fine, coated metal particles are kept in a heated aqueous alkali solution, Ti oxide wires are formed on the fine, coated metal particles. The Ti oxide wires increase the specific surface area of the particles. Ti oxide wires are preferably 0.05-0.1 μm in diameter and 0.5-3 μm in length. Larger Ti oxide wires tend to reduce the saturation magnetization of the fine, coated metal particles, and become free.

(4) Magnetic Separation

The resultant metal magnetic particles are likely to contain excess non-magnetic components ($TiO_2$-based titanium oxide), it is preferable to collect only magnetic particles by conducting magnetic separation operations plural times using a permanent magnet, if necessary.

[2] Structure and Properties of Fine, Coated Metal Particles (1) Average Particle Size of Fine, Coated Metal Particles The average particle size of the fine, coated metal particles obtained by the above method depends on the particle size of the M oxide powder. To obtain high corrosion resistance and dispersibility, the average particle size d50 of the fine, coated metal particles is preferably 0.1-10 μm, more preferably 0.1-6 μm. When the average particle size is less than 0.1 μm, each fine, coated metal particle does not have sufficiently thick coating, resulting in low corrosion resistance. When the average particle size exceeds 10 μm, the fine, coated metal particles have low dispersibility in a liquid. The average particle size d50 is measured by a wet particle size meter according to laser diffraction.

(2) Coating Ratio

To increase the coating ratio of the fine particles of the metal M, the fine particles of the metal M are preferably sufficiently smaller than the Ti oxide coating. Specifically, the ratio D/d50 of the average particle size D of the fine metal particles to the average particle size d50 of the fine, coated metal particles is preferably 0.5 or less.

(3) Thickness of Coating

The thickness of the $TiO_2$-based titanium oxide coating is preferably 1-10000 nm. When the thickness is less than 1 nm, the fine, coated metal particles do not have sufficient corrosion resistance. When the thickness is more than 10000 nm, the fine, coated metal particles are too large to have good dispersibility in a liquid, and fail to have high saturation magnetization in the case of fine, magnetic metal particles. The more preferred thickness of the Ti oxide coating is 5-5000 nm. The thickness of the coating is determined from a transmission electron micrograph of the fine, coated metal particles. When the Ti oxide coating has uneven thickness, an average of the maximum thickness and the minimum thickness is regarded as the thickness of the Ti oxide coating. Incidentally, the fine metal particles may not be coated with $TiO_2$-based titanium oxide completely, but the metal particles may be partially exposed on the surface. However, the fine metal particles are preferably coated with $TiO_2$-based titanium oxide entirely.

(4) Average Particle Size of Metal Particles

The average particle size D of the M metal particles coated with $TiO_2$-based titanium oxide is preferably 1 μm or less, more preferably 0.01-1 μm. The average particle size D of the fine metal particles is defined as an average value obtained by measuring the maximum and minimum diameters of each fine metal particle in a SEM photograph (backscattered electron image), calculating the particle size Dn of each fine metal particle by (maximum diameter+minimum diameter)/2, and dividing the sum Σ Dn of the particle sizes of all fine metal particles (excluding undiscernibly small metal particles) by the number n of all fine metal particles in a field of the SEM photograph. The average particle size D of the M metal particles preferably have relatively small unevenness, 50% or more of them being in a range of 0.1-1 μm, particularly in a range of 0.1-0.8 μm. When the average particle size D of the M metal particles is more than 1 μm, Ti oxide fails to cover the M metal particles sufficiently, resulting in the fine, coated metal particles with low corrosion resistance. Particularly when the metal M is magnetic metal Fe, which is extremely vulnerable to oxidation, the average particle size D of the fine Fe particles is preferably 0.01-1 μm to sufficiently prevent oxidation by the coating. When the average particle size D of the fine Fe particles is less than 0.01 μm, the fine, coated metal particles have large coercivity, resulting in low magnetization due to superparamagnetism.

(5) Coating Structure

The M metal particle and the Ti oxide coating layer need not form a 1:1 core-shell structure, but two or more M metal particles may be dispersed in the $TiO_2$-based titanium oxide layer. Ti oxide containing two or more M metal particles is preferable because of high metal M percentage and sure covering. For instance, two or more fine Fe particles having an average particle size D of 1 μm or less are preferably embedded in the Ti oxide layer. When two or more fine particles of the metal M are contained in the $TiO_2$-based titanium oxide particles, the ratio D/d50 of each fine particle is preferably 0.5 or less. With such structure, the coating has enough thickness and improved corrosion resistance.

In the present invention, because the fine particles of the metal M and the Ti oxide coating are formed simultaneously by the reduction of the M oxide, there is no M metal oxide layer observed between the fine metal M particle and the Ti oxide coating. Also, the Ti oxide coating obtained by a heat treatment at 650° C. or higher has high crystallinity, thereby exhibiting higher corrosion resistance than that of an amorphous or low-crystallinity Ti oxide coating formed by a sol-gel method, etc. Because the fine, coated metal particles of the present invention having a $TiO_2$-based coating have little defects in their coating, they have higher corrosion resistance than that of the $Ti_nO_{2n-1}$ coating having a nonstoichiometric composition.

(6) Crystallinity of Ti Oxide

When the maximum peak of $TiO_2$ has a half-width of 0.3° or less, and the intensity ratio of the maximum peak of $TiO_2$ to the maximum peak of the metal M is 0.03 or more, in the X-ray diffraction pattern of the fine, coated metal particles, it is considered that Ti oxide has good crystallinity so that the fine, coated metal particles have good corrosion resistance. No peaks or broad peaks are observed in the case of amorphous or low-crystallinity particles, resulting in a small intensity ratio of the maximum peak, and a wide half-width. The maximum peak intensity ratio is more preferably 0.05 or more. The higher the maximum peak intensity ratio, the more the percentage of the coating, resulting in low saturation magnetization. Accordingly, the maximum peak intensity ratio is preferably 3 or less.

(7) Function as Magnetic Particles

When the metal M is a magnetic metal Fe, the fine, coated metal particles produced by the above method have saturation magnetization in a range of 50-180 $A·m^2/kg$, functioning as magnetic particles. In this case, the ratio of Ti to Fe+Ti is 11-67% by mass, when the fine, coated metal particles are composed of the magnetic metal Fe and $TiO_2$. The ratio of Ti can be calculated from the measured saturation magnetization of the fine, coated metal particles, after it is confirmed from an X-ray diffraction pattern that the fine, coated metal particles are composed of Fe and $TiO_2$. When the saturation magnetization of the magnetic particles is as small as less than 50 $A·m^2/kg$, the magnetic particles have slow response to a magnetic field. On the other hand, when the saturation magnetization exceeds 180 $A·m^2/kg$, the content of the $TiO_2$-based titanium oxide is too low (the mass ratio of Ti to Fe+Ti is less than 11%) to sufficiently cover the metal Fe particles with the Ti oxide, resulting in low corrosion resistance and easily deteriorated magnetic properties. Accordingly, to achieve high saturation magnetization and sufficient corrosion resistance simultaneously, the saturation magnetization of the fine, coated metal particles is preferably 180 $A·m^2/kg$ or less. To exhibit excellent magnetic separation performance and isolation of target organism when used for magnetic beads, etc., the saturation magnetization of the fine, coated metal particles is more preferably 95-180 A·m²/kg. Saturation magnetization in this range cannot be obtained by magnetite ($Fe_3O_4$) having as small saturation magnetization as about 92 A·m²/kg.

From the aspect of dispersibility, the coercivity of the fine, coated metal particles is preferably 15 kA/m or less, more preferably 8 kA/m (100 Oe) or less, most preferably 4 kA/m or less. Even when the fine, coated metal particles have large coercivity, high dispersibility would be obtained with a thick $TiO_2$ coating, but it would decrease the saturation magnetization of the fine, coated metal particles. When the coercivity exceeds 8 kA/m, magnetic particles would be magnetically agglomerated without a magnetic field, resulting in low dispersibility in a liquid.

(8) Corrosion Resistance

Because the metal M core is substantially completely coated with a $TiO_2$-based titanium oxide, the fine, coated metal particles of the present invention has high corrosion resistance. When 1 part by mass of the fine, coated metal particles are kept in 100 parts by mass of pure water (25° C.) for 1 hour, the amount of Fe eluted into pure water is preferably less than 0.01 ppm (less than ICP analysis limit). The pure water is ion-exchanged and distilled water. The amount of Fe eluted was measured by ICP. When a highly corrosive physiological saline solution is used as a solvent, the amount of Fe eluted is preferably 0.1 ppm or less when 2.5 parts by mass of the fine, coated metal particles are kept in 100 parts by mass of the physiological saline solution at 25° C. for 72 hours. With 0.1 ppm or less of the eluted Fe, the fine, coated metal particles of the present invention are suitably usable for magnetic beads, etc. requiring high corrosion resistance for use in a solution.

A further important performance of the fine, coated metal particles is high corrosion resistance under severe conditions. When 25 mg of fine, coated metal particles, in which the metal M is Fe, are immersed in 1 mL of a 6-M aqueous guanidine hydrochloride solution at 25° C. for 24 hours, the amount of Fe ion eluted is preferably 100 mg/L or less. Because the fine, coated metal particles exhibit high corrosion resistance even in a high-concentration chaotropic salt solution, they are suitable for DNA extraction, etc. needing treatment in an aqueous chaotropic salt solution. Although a corrosion resistance level, at which the amount of Fe ion eluted is 100 mg/L or less, could be obtained without the alkali treatment, the alkali treatment is preferable to surely achieve the above corrosion resistance level.

The fine, coated metal particles of the present invention comprise fine particles of the metal M well coated with $TiO_2$-based titanium oxide, resulting in the suppression of the elution of the high-corrosion-resistance metal M. Accordingly, they do not have large influence on cells. For instance, when $0.2 \times 10^5$ PC-3 cells are added to 0.05 mL of PBS containing fine, coated metal particles at a concentration of 2 mg/mL and incubated in 5%-$CO_2$-containing air at 37° C. for 72 hours in a $CO_2$ incubator, the number of the cells can be 50% or more when incubated without adding the fine, coated metal particles. Fine, coated metal particles having little influence on cells are suitable as beads for biochemical or medical use. To further improve corrosion resistance, an additional corrosion-resistant layer may be formed on the $TiO_2$-based titanium oxide.

The present invention will be described in further detail referring to Examples below without intention of restricting the present invention thereto.

Example 1

Figure 1:
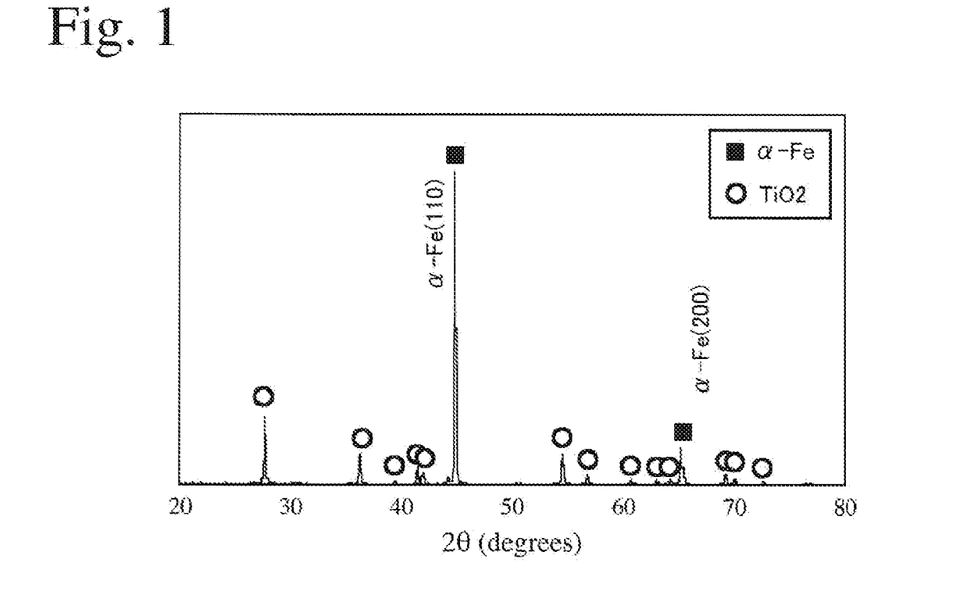
FIG. 1 is a graph showing the X-ray diffraction pattern of the sample powder of Example 1.

$\alpha$-$Fe_2O_3$ powder having an average particle size of 0.03 μm and TiC powder having an average particle size of 1 μm were mixed at a mass ratio of 7:3 (TiC: 30% by mass) for 10 hours in a ball mill, and the resultant mixed powder was heat-treated at 700° C. for 2 hours in a nitrogen gas in an alumina boat, and cooled to room temperature. The X-ray diffraction pattern of the sample powder is shown in FIG. 1, in which the axis of abscissas shows 2θ (°) of diffraction, and the axis of ordinate shows diffraction intensity (relative value). By analysis with Jade, Ver. 5, an analysis software available from MDI, diffraction peaks were identified as $\alpha$-Fe and $TiO_2$ having a rutile structure.

The average crystal grain size of Fe calculated from the half-width of a (200) peak of $\alpha$-Fe by a Scherrer's equation was 90 nm. The half-width of the maximum diffraction peak of $TiO_2$ was 0.14 at 2θ=27.5°, and the intensity ratio of the maximum diffraction peak intensity of $TiO_2$ to the maximum diffraction peak [(110) peak] of $\alpha$-Fe was 0.18. This revealed that $TiO_2$ had high crystallinity. The average particle size d50 of this sample powder measured by a laser diffraction particle size distribution meter (LA-920 available from HORIBA) was 3.1 μm.

Figure 2:
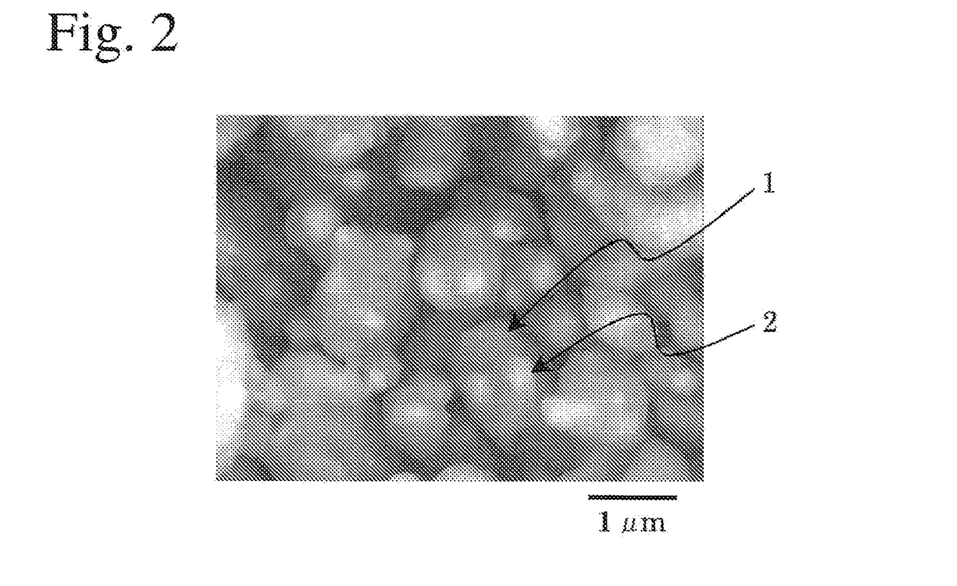
FIG. 2 is a SEM photograph (backscattered electron image) showing the sample powder of Example 1.

Fine, coated metal particles having particle sizes of one to several μm were observed in the SEM photograph (FIG. 2) of the sample powder. In most fine, coated metal particles, pluralities of Fe particles 2 (fine white particles) each coated with a $TiO_2$ layer 1 were observed. For instance, an Fe particle 2 coated with a $TiO_2$ layer shown by the arrow had a particle size of about 0.5 μm.

With respect to the standard energy of formation of oxide, $\Delta G_{Fe2O3}$ is −740 kJ/mol, and $\Delta G_{TiO2}$ is −889 kJ/mol, indicating that the standard energy of formation of $TiO_2$ is smaller. Accordingly, it is the that $\alpha$-$Fe_2O_3$ was reduced by Ti, forming $TiO_2$.

The measurement of the magnetic properties of this sample powder at the maximum magnetic field of 1.6 MA/m by a vibrating sample magnetometer (VSM) revealed that it had saturation magnetization Ms of 113 A·m²/kg and coercivity iHc of 2.6 kA/m. Because the value of this saturation magnetization Ms corresponds to 52% of the saturation magnetization (=218 A·m²/kg) of bulk Fe, the Fe content was 52% by mass, and the $TiO_2$ content was 48% by mass, in this sample powder. Because of a high $TiO_2$ content, it is presumed that Fe was substantially completely covered with $TiO_2$.

To evaluate corrosion resistance, 0.2 g of the above sample powder was added to 20 g of ion-exchanged and distilled pure water at 25° C., and a supernatant liquid was taken after 1 hour to measure the concentration of Fe ion in water by ICP analysis. As a result, the amount of Fe eluted was as small as less than 0.01 ppm. Also, 25 mg of the above sample powder was added to 1 g of a physiological saline solution at 25° C., and a supernatant liquid was taken after 72 hours to measure the concentration of Fe ion in the physiological saline solution by ICP analysis. As a result, the amount of Fe eluted was as small as 0.01 ppm.

As described above, a small amount of Fe eluted and nearly 50% of a $TiO_2$ content indicates that the coating ratio of the fine Fe particles with $TiO_2$ was extremely high. Also, the resultant Ti oxide had a stoichiometric composition of $TiO_2$, it had high crystallinity, being expected to have an excellent photo-catalytic function.

Example 2

Sample powder was produced in the same manner as in Example 1 except for changing the heat treatment temperature to 800° C. X-ray diffraction measurement provided the same diffraction pattern as in Example 1. An average crystal grain size determined from a (200) peak of α-Fe was 84 nm. The maximum diffraction peak of $TiO_2$ had a half-width of 0.15 at 2θ=27.5°, and an intensity ratio of this the maximum peak to the maximum diffraction peak [(110) peak] of α-Fe was 0.12. The sample powder also had an average particle size d50 of 3.0 μm. With respect to magnetic properties, it had saturation magnetization Ms of 115 A·m²/kg and coercivity iHc of 3.9 kA/m. With respect to corrosion resistance, the amount of Fe eluted was less than 0.01 ppm in pure water at 25° C., and 0.02 ppm in a physiological saline solution at 25° C.

Example 3

Sample powder was produced in the same manner as in Example 1 except for changing the heat treatment temperature to 900° C. X-ray diffraction measurement indicated only diffraction peaks corresponding to α-Fe and $TiO_2$. The maximum diffraction peak of $TiO_2$ had a half-width of 0.26 at 2θ=36°, and an intensity ratio of the maximum diffraction peak of $TiO_2$ to the maximum diffraction peak [(110) peak] of α-Fe was 0.03. The sample powder also had an average particle size d50 of 2.3 μm. With respect to magnetic properties, it had saturation magnetization Ms of 131 A·m²/kg and coercivity iHc of 2.6 kA/m. With respect to corrosion resistance, the amount of Fe eluted was less than 0.01 ppm in pure water at 25° C., and 0.03 ppm in a physiological saline solution at 25° C.

Comparative Example 1

Figure 3:
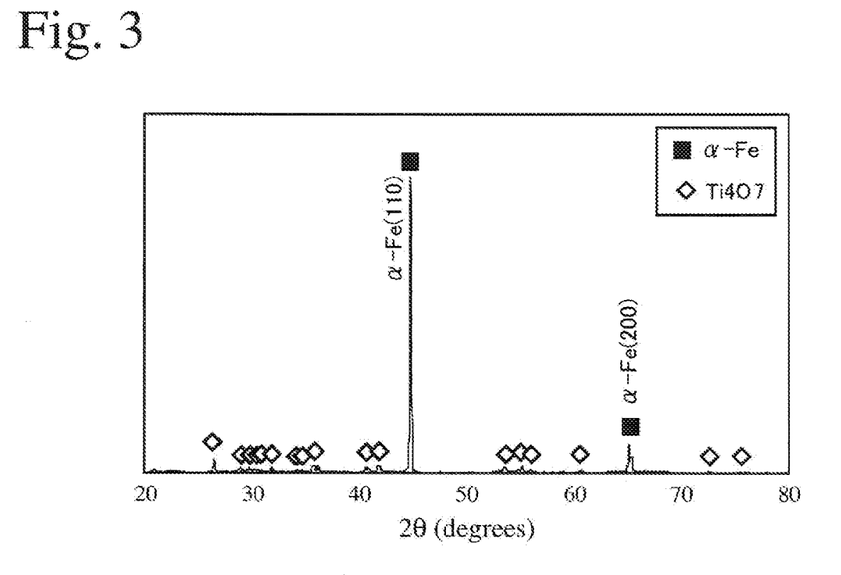
FIG. 3 is a graph showing the X-ray diffraction pattern of the sample powder of Comparative Example 1.
Figure 4:
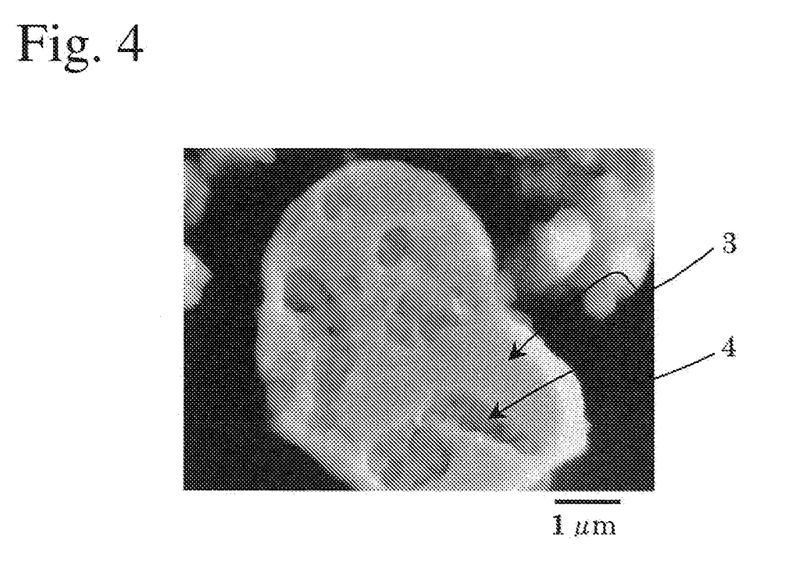
FIG. 4 is a SEM photograph (backscattered electron image) showing the sample powder of Comparative Example 1.

Sample powder was produced in the same manner as in Example 1 except for changing the heat treatment temperature to 1000° C. FIG. 3 shows the X-ray diffraction pattern of the sample powder. In addition to α-Fe, a diffraction peak of $Ti_4O_7$ having a nonstoichiometric composition was observed. The maximum diffraction peak of $T_4O_7$ appeared at 2θ=26.50, and its half-width was 0.18. An intensity ratio of the maximum diffraction peak of $Ti_4O_7$ to the maximum diffraction peak [(110) peak] of α-Fe was as small as 0.04. With no $TiO_2$ peak observed, the intensity ratio of the maximum diffraction peak of $TiO_2$ to the maximum diffraction peak [(110) peak] of α-Fe was 0. With respect to magnetic properties, it had saturation magnetization Ms of 121 A·m²/kg and coercivity iHc of 2.0 kA/m. In the SEM photograph (FIG. 4) of the sample powder, no white fine particles were observed unlike in FIG. 2, and recesses 4 were observed on particle surfaces. EDX analysis revealed that the recesses 4 were made of Ti oxide, and that smooth portions 3 were an Fe phase. This appears to be due to the fact that because the heat treatment temperature was as high as 1000° C., Fe particles grew, resulting in flat surfaces. With respect to corrosion resistance, the amount of Fe eluted into a physiological saline solution at 25° C. was 0.22 ppm.

Comparative Example 2

$Nb_2O_5$ powder having an average particle size of 4 μm and TiC powder having an average particle size of 1 μm were mixed at a mass ratio of 7:3 for 10 hours in a ball mill, and the resultant mixed powder was heat-treated at 700° C. for 2 hours in a nitrogen gas in an alumina boat, and then cooled to room temperature.

X-ray diffraction measurement indicated diffraction peaks of $Nb_2O_5$ and TiC, suggesting that $Nb_2O_5$ was not reduced. With respect to the standard energy of formation of oxide, $\Delta G_{Nb2O5}$ is −1766 kJ/mol while $\Delta G_{TiO2}$ is −889 kJ/mol, indicating a small standard energy of formation of $Nb_2O_5$. It is presumed that a reduction reaction did not proceed.

Comparative Example 3

Carbonyl iron particles having an average particle size of 1.1 μm were subjected to the same test of corrosion resistance to pure water as in Example 1. The amount of Fe eluted was 0.05 ppm. Because the carbonyl iron particles did not have coating layers, Fe eluted extremely.

Comparative Example 4

Figure 5:
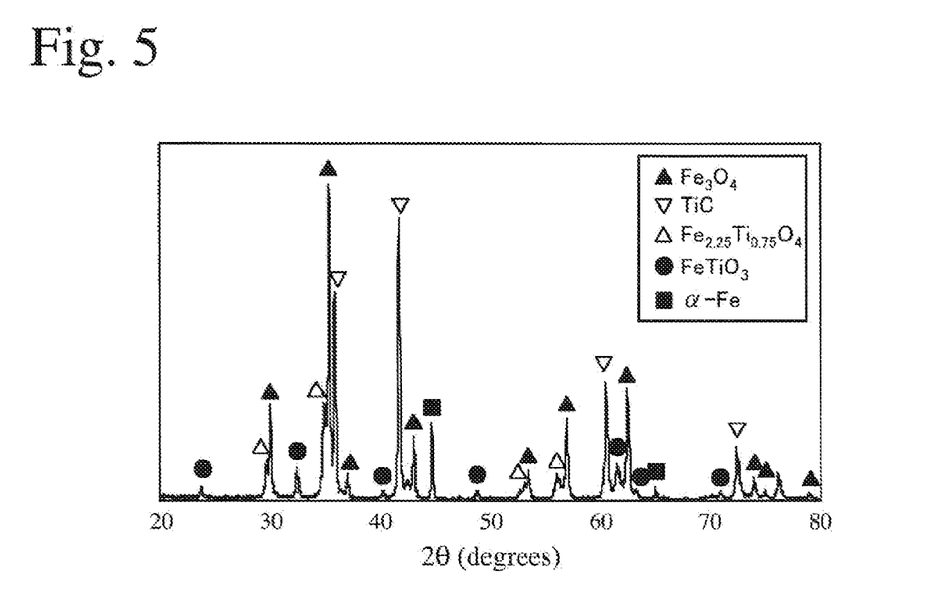
FIG. 5 is a graph showing the X-ray diffraction pattern of the sample powder of Comparative Example 4.

Sample powder was produced in the same manner as in Example 1 except for changing the heat treatment temperature to 600° C. FIG. 5 shows the X-ray diffraction pattern of this sample powder. The maximum diffraction peak corresponded to magnetite ($Fe_3O_4$), with small diffraction peak intensity of α-Fe. This indicates that hematite ($Fe_2O_3$), a starting material, was insufficiently reduced. The diffraction peak of TiC was also relatively large, confirming that a heat treatment at 600° C. was insufficient to react $Fe_2O_3$ with TiC. There was no peak of Ti oxide, and Fe—Ti—O ternary compounds such as $Fe_{2.25}Ti_{0.75}O_4$ and $FeTiO_4$ were formed. This indicates that a heat treatment at 600° C. failed to provide Fe particles coated with $TiO_2$.

The measurement results in Examples 1-3 and Comparative Example 1 are shown in Table 1. In Examples 1-3 in which the heat treatment temperature was 700-900° C., $TiO_2$ coatings were formed, and their maximum diffraction peaks of $TiO_2$ had half-widths of 0.14-0.26, in a range of 0.3 or less. Their intensity ratios of the maximum diffraction peak of $TiO_2$ to the maximum diffraction peak of α-Fe were 0.03-0.18, in a range of 0.03 or more. The amount of Fe eluted into a physiological saline solution was as small as 0.03 ppm or less Examples 1-3, exhibiting good corrosion resistance. Particularly in Examples 1 and 2 in which the peak intensity ratio was 0.12-0.18, in a range of 0.05 or more, the amount of Fe eluted was as small as 0.02 ppm or less, exhibiting excellent corrosion resistance.

TABLE 1

| No. | Heat Treatment Temperature (° C.) | Average Particle Size d50 (μm) | Half-Width[1] | $I_{TiO2}/I_{Fe}$[2] |
| --- | --- | --- | --- | --- |
| Example 1 | 700 | 3.1 | 0.14 | 0.18 |
| Example 2 | 800 | 3.0 | 0.15 | 0.12 |
| Example 3 | 900 | 2.3 | 0.26 | 0.03 |
| Comparative Example 1 | 1000 | 3.3 | — | 0 |

| | Magnetic Properties | | Amount of Fe Eluted (ppm) | |
| --- | --- | --- | --- | --- |
| No. | Ms (Am²/kg) | iHc (kA/m) | In Pure Water | In Physiological Saline Solution |
| Example 1 | 113 | 2.6 | <0.01 | 0.01 |
| Example 2 | 115 | 3.9 | <0.01 | 0.02 |

TABLE 1-continued

| Example 3 | 131 | 2.6 | <0.01 | 0.03 |
| Comparative Example 1 | 121 | 2.0 | —[3] | 0.22 |

Note:
[1]Half-width (relative value) of the maximum diffraction peak of $TiO_2$.
[2]A ratio of the maximum diffraction peak intensity ($I_{TiO2}$) of $TiO_2$ to the maximum diffraction peak intensity ($I_{Fe}$) of α-Fe.
Note:
[3]Not measured.

Example 4

Figure 6:
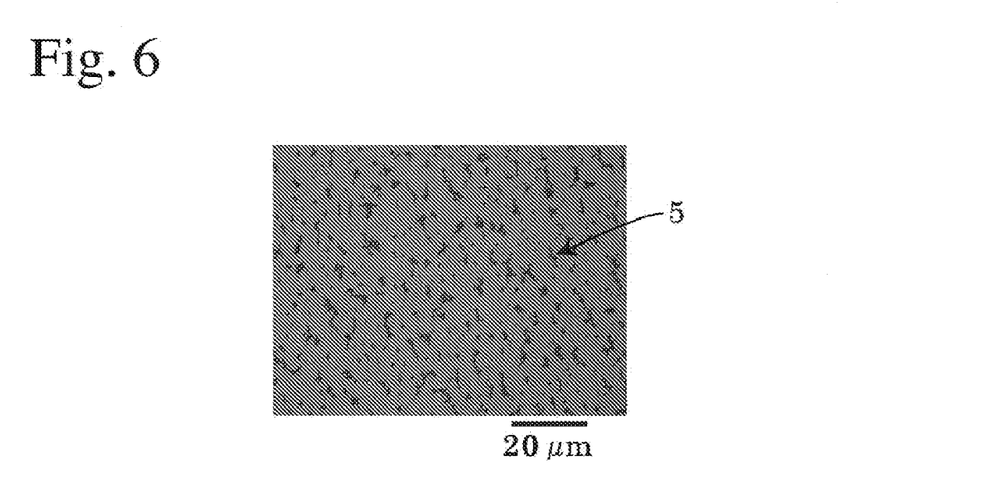
FIG. 6 is an optical microscopic photograph showing the dispersion of the sample powder of Example 4 in water.

5 g of the sample powder obtained in Example 1 and 50 mL of isopropyl alcohol (IPA) were charged into a 100-mL beaker, and irradiated with ultrasound for 10 minutes. A permanent magnet was then brought into contact with an outer surface of the beaker for 1 minute, to cause only the magnetic particles to attach to an inner surface of the beaker, thereby removing a blackish-gray supernatant liquid. This magnetic separation operation was repeated 50 times, and the purified magnetic particles were dried at room temperature. The magnetic properties of the magnetic particles were measured by a VSM in the same manner as in Example 1. The ratio of Ti in the magnetic particles was calculated from the measured saturation magnetization of the fine, coated metal particles, after it was confirmed from X-ray diffraction pattern that the fine, coated metal particles were composed of Fe and $TiO_2$. The results are shown in Table 2. 5 mg of the magnetic particles were dispersed in 1 g of pure water, stirred for 10 minutes in a Vortex mixer. Thereafter, the resultant dispersion liquid was dropped onto a slide glass to observe the dispersion of magnetic particles by an optical microscope. The results are shown in FIG. 6.

Example 5

Figure 7:
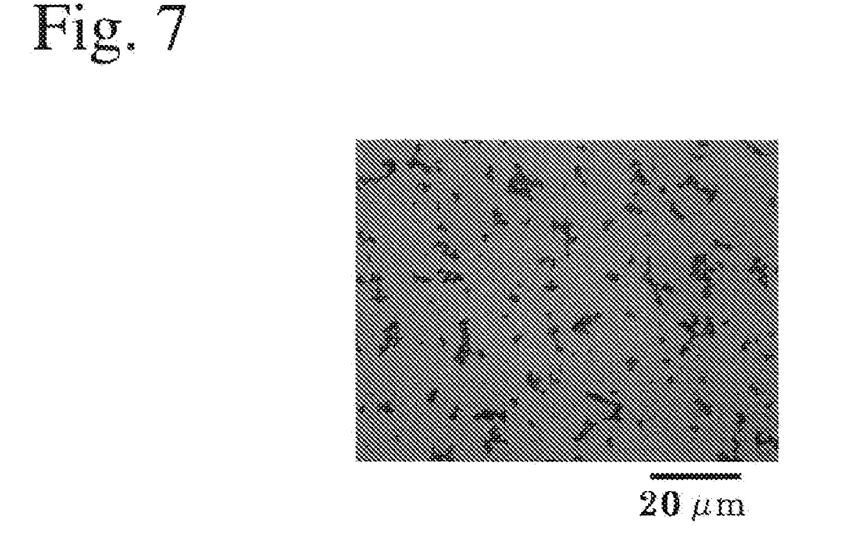
FIG. 7 is an optical microscopic photograph showing the dispersion of the sample powder of Example 5 in water.

Sample powder was produced in the same manner as in Example 1 except for changing the mass ratio of α-$Fe_2O_3$ powder to TiC powder to 6.5:3.5. Magnetic particles were obtained by purifying this sample powder in the same manner as in Example 4, and their composition and magnetic properties were measured in the same manner as in Example 4. The results are shown in Table 2. The dispersion of the magnetic particles in pure water was also observed in the same manner as in Example 4. The results are shown in FIG. 7.

Example 6

Figure 8:
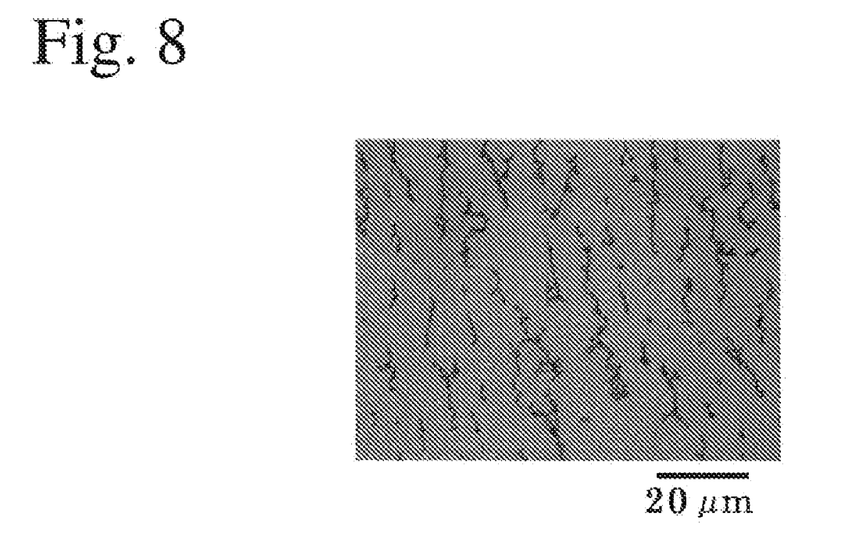
FIG. 8 is an optical microscopic photograph showing the dispersion of the sample powder of Example 6 in water.

Sample powder was produced in the same manner as in Example 1 except for changing the mass ratio of α-$Fe_2O_3$ powder to TiC powder to 6:4. Magnetic particles were obtained by purifying this sample powder in the same manner as in Example 4, and their composition and magnetic properties were measured in the same manner as in Example 4. The results are shown in Table 2. The dispersion of the magnetic particles in pure water was also observed in the same manner as in Example 4. The results are shown in FIG. 8.

Example 7

Figure 9:
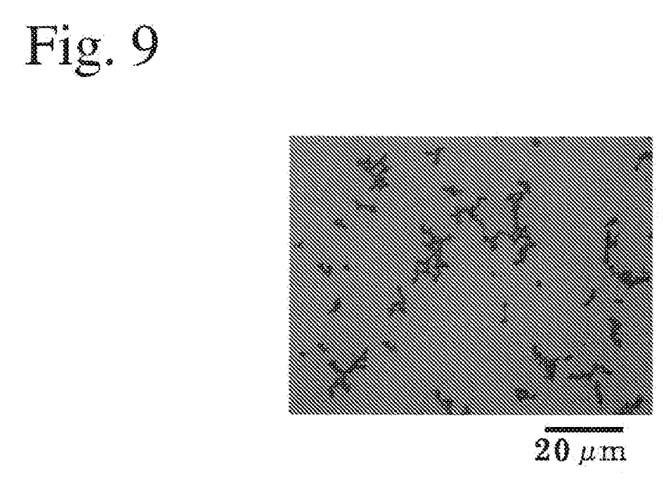
FIG. 9 is an optical microscopic photograph showing the dispersion of the sample powder of Example 7 in water.

Sample powder was produced in the same manner as in Example 1 except for changing the mass ratio of α-$Fe_2O_3$ powder to TiC powder to 5:5. Magnetic particles were obtained by purifying this sample powder in the same manner as in Example 4, and their composition and magnetic properties were measured in the same manner as in Example 4. The results are shown in Table 2. The dispersion of the magnetic particles in pure water was also observed in the same manner as in Example 4. The results are shown in FIG. 9.

Example 8

Sample powder was produced in the same manner as in Example 1 except for changing the mass ratio of α-$Fe_2O_3$ powder to TiC powder to 4:6. This sample powder was purified in the same manner as in Example 4 except that separation with a permanent magnet was conducted for 5 minutes or more, and the composition and magnetic properties of the resultant magnetic particles were measured in the same manner as in Example 4. The results are shown in Table 2. The magnetic particles had high corrosion resistance, with saturation magnetization Ms of 48 A·m²/kg, lower than 50 A·m²/kg, and coercivity iHc of 18 kA/m, more than 15 kA/m.

TABLE 2

| No. | $Fe_2O_3$:TiC Mass Ratio[1] | Fe:Ti Mass Ratio[2] | Magnetic Properties | |
| --- | --- | --- | --- | --- |
| | | | Ms (Am²/kg) | iHc (kA/m) |
| Example 4 | 7:3 | 71:29 | 130 | 3.8 |
| Example 5 | 6.5:3.5 | 66:34 | 116 | 6.2 |
| Example 6 | 6:4 | 60:40 | 103 | 8.5 |
| Example 7 | 5:5 | 47:53 | 75 | 13 |
| Example 8 | 4:6 | 32:68 | 48 | 18 |

Note:
[1]Mass ratio of $Fe_2O_3$ to TiC in the starting material.
[2]Mass ratio of Fe:Ti in the purified magnetic particles.

As is clear from Table 2, the magnetic properties depend on the formulation of the starting material; the lower TiC ratio provided lower coercivity iHc. In FIGS. 6-9, black portions 5 indicate $TiO_2$-coated Fe particles. It is clear from FIGS. 6-9 that magnetic particles having larger coercivity tend to be more agglomerated in water.

Examples 9-14

Sample powders of Examples 9-13 were produced in the same manner as in Example 1, except for using α-$Fe_2O_3$ powder having the same particle size as in Example 1 and TiC powders having various particle sizes. Sample powder of Example 14 was also produced in the same manner as in Example 1 except for using a bead mill instead of the ball mill, and changing the heat treatment temperature to 800° C. The mixed powder before the heat treatment and the sample powder after the heat treatment were measured with respect to an average particle size d50 by a laser diffraction method. The results are shown in Table 3. The average particle size D of fine Fe particles in the coated particles of Examples 10-12 and 14 was measured to determine D/d50. The results are shown in Table 4. Particle size variations of the starting material powder changed d50 from 0.8 μm to 5.0 μm. Also, as the average particle size d50 decreased, D/d50 changed to 0.19-0.45, which were 0.5 or less, indicating that thick $TiO_2$ coating covered the metal particles.

TABLE 3

| No. | Average Particle Size d50 of Fine, TiO$_2$-Coated Fe Particles (μm) | |
|---|---|---|
| | Before Heat Treatment | After Heat Treatment |
| Example 9 | 2.5 | 5.0 |
| Example 10 | 1.7 | 3.7 |
| Example 11 | 1.4 | 2.9 |
| Example 12 | 0.5 | 2.0 |
| Example 13 | 0.4 | 1.1 |
| Example 14 | 0.4 | 0.8 |

TABLE 4

| No. | Average Particle Size D of Fine Fe Particles (μm) | D/d50 |
|---|---|---|
| Example 10 | 0.7 | 0.19 |
| Example 11 | 0.6 | 0.21 |
| Example 12 | 0.7 | 0.35 |
| Example 14 | 0.36 | 0.45 |

The influence of the fine, coated metal particles on the proliferation of cells was examined by a WST-1 method. Human prostate cancer cells (PC-3 cells) were added to a cell-proliferating medium at 4×10$^5$ cells/mL, and charged into a 96-well cultivation plate in an amount of 0.05 mL (0.2×10$^5$ cells/well). 0.05 mL of a phosphate-buffered saline (PBS) containing 2 mg/mL of the fine, coated metal particles of Example 12 was introduced into the cultivation plate. 0.05 mL of PBS containing no fine, coated metal particles was introduced into another cultivation plate.

These cultivation plates were placed in a 5%-CO$_2$-containing air at 37° C., and incubated for 72 hours. Using Cell Counting Kit No. 349-06461 available from Dojindo Laboratories, a predetermined amount of a color reagent was added to each well to cause a color reaction for 4 hours, and the magnetic particles were magnetically separated to measure the absorbance of a cell solution by a microplate reader. The number of cells was determined from the relation between absorbance and the number of cells. The ratio of the number of cells when the fine, coated metal particles were added to that when the fine, coated metal particles were not added was 64%.

For comparison, the same evaluation as above was conducted, except for using, in place of the fine, coated metal particles of Example 12, graphite-coated Fe particles obtained by mixing α-Fe$_2$O$_3$ powder having an average particle size of 0.03 μm and C powder having an average particle size of 0.02 μm at a mass ratio of 75:25, and heat-treating them at 1400° C. for 2 hours in nitrogen. As a result, the ratio of the number of cells when the graphite-coated Fe particles were added to that when the graphite-coated Fe particles were not added was as low as 29%.

Examples 15-24

Fine, coated metal particles were produced in the same manner as in Example 13, except for changing the heat treatment temperature of the mixed powder to 800° C. (Reference Example 1 and Examples 15-20) or 900° C. (Reference Example 2 and Examples 21-24). Each of the resultant fine, coated metal particles was introduced into a ball mill containing the aqueous alkali solution shown in Table 5, and rotated for 24 hours for an alkali treatment. An alkali source in the aqueous alkali solution was NaOH, KOH, or an alkaline surfactant (DEMOL EP available from Kao Corporation). After disintegration, the fine, coated metal particles were magnetically separated in IPA, and dried to obtain sample powder.

The d50, saturation magnetization and coercivity of the sample powder were measured in the same manner as in Example 1. The results are shown in Table 5. After 25 mg of each sample powder was immersed in 1 mL of a 6-M aqueous guanidine hydrochloride solution at 25° C. for 24 hours, the amount of Fe ion eluted was measured by ICP analysis. The amount of Fe ion eluted was also measured on sample powders obtained by the same method except for treatment with pure water containing no alkali source (Reference Examples 1 and 2). The results are shown in Table 5.

TABLE 5

| | Alkali Source | | Amount of Fe Ion |
|---|---|---|---|
| No. | Type | Concentration | Eluted (mg/l)[1] |
| Reference Example 1 | — | 0 M | 26.0 |
| Example 15 | NaOH | 0.01 M | 9.4 |
| Example 16 | NaOH | 0.1 M | 11.4 |
| Example 17 | NaOH | 1.0 M | 10.3 |
| Example 18 | KOH | 0.01 M | 10.1 |
| Example 19 | KOH | 0.1 M | 4.8 |
| Example 20 | KOH | 1.0 M | 3.2 |
| Reference Example 2 | — | 0 wt. % | 217.0 |
| Example 21 | Surfactant | 0.01 wt. % | 35.8 |
| Example 22 | Surfactant | 0.1 wt. % | 23.6 |
| Example 23 | Surfactant | 1 wt. % | 18.0 |
| Example 24 | Surfactant | 10 wt. % | 93.8 |

Note:
[1] The amount of Fe ion eluted into the 6-M aqueous guanidine hydrochloride solution.

As is clear from Table 5, a smaller amount of Fe ion eluted and improved corrosion resistance were obtained in the sample powders treated with an aqueous alkali solution than in those treated with pure water. Even the fine, coated metal particles with the elution of 100 mg/L of Fe ion were provided with corrosion resistance improved to 100 mg/L or less by alkali treatment.

Examples 25-30

The sample powder of Example 13 was subjected to an alkali treatment comprising immersion in an aqueous NaOH solution at the concentration shown in Table 6, and keeping at 60° C. for 24 hours. After the alkali treatment, magnetic separation was conducted to remove the aqueous NaOH solution, and the sample powder was washed with IPA 3 times and dried. With 25 mg of the sample powder immersed in 1 mL of a 6-M aqueous guanidine hydrochloride solution at 25° C. for 24 hours, the amount of Fe ion eluted was measured by ICP analysis. The same measurement was conducted on a sample powder not subjected to the above alkali treatment (Reference Example 3). These results are shown in Table 6.

TABLE 6

| No. | Concentration of NaOH | Amount of Fe Eluted (mg/L)[1] |
|---|---|---|
| Reference Example 3 | — | 179.0 |
| Example 25 | 0.3M | 75.6 |
| Example 26 | 0.5M | 25.3 |

TABLE 6-continued

| No. | Concentration of NaOH | Amount of Fe Eluted (mg/L)[1] |
|---|---|---|
| Example 27 | 0.8M | 19.0 |
| Example 28 | 1M | 21.7 |
| Example 29 | 2M | 22.5 |
| Example 30 | 3M | 18.9 |

Note:
[1]The amount of Fe ion eluted into a 6-M aqueous guanidine hydrochloride solution.

Table 6 shows that the amount of Fe ion eluted was smaller in the alkali-treated sample powders than in those without alkali treatment, suggesting that the alkali treatment is effective to improve the corrosion resistance. Even the fine, coated metal particles with the elution of more than 100 mg/L of Fe ion were improved to have corrosion resistance of 100 mg/L or less by the alkali treatment.

Figure 10:
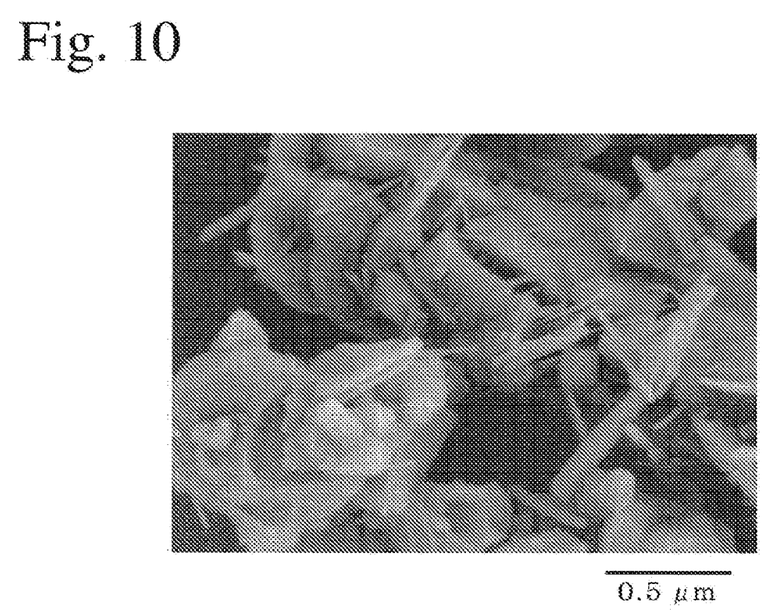
FIG. 10 is a SEM photograph showing the sample powder of Example 28.

The SEM photograph (FIG. 10) of the alkali-treated sample Example 28 indicates that wires of 0.05-0.1 μm in diameter and 0.3-1 μm in length were formed on the fine, coated metal particles. Composition analysis by EDX revealed that the wires were composed of Ti oxide. The wires increased the specific surface area of the fine, coated metal particles.

The sample powders of Reference Example 3 and Examples 28 and 30 were subjected to surface composition analysis by X-ray photoelectron spectroscopy. Ti, O, C and Fe were detected in each sample powder. In the sample powder of Example 30, Na was also detected. The detected amount of Fe was by atomic ratio 0.15%, 0.06%, and 0.07%, respectively, in Reference Example 3 and Examples 28 and 30. The fact that a small amount of the metal M was detected by X-ray photoelectron spectroscopy means that there is a small amount of the metal M on the particle surface. The fact that the amount of the metal component detected on the particle surface is 0.2% or less without alkali treatment means that the metal M is well coated with Ti oxide. The amount of Fe detected was reduced to 0.1% or less by the alkali treatment. A small amount of Fe existing on the surface of the fine, coated metal particle is advantageous for corrosion resistance.

EFFECT OF THE INVENTION

The present invention produces fine, coated metal particles with excellent corrosion resistance easily at low cost. The fine, coated metal particles of the present invention function as magnetic particles, when the metal M is a magnetic metal such as Fe, Co, etc. Because the magnetic metal is coated with a high-corrosion-resistance Ti oxide layer, the fine, coated metal particles are suitable as magnetic beads, etc. needing high corrosion resistance for use in a corrosive solution.

What is claimed is:

1. A method for producing fine, coated metal particles comprising the steps of mixing Ti-containing powder except for Ti oxide powder with oxide powder of a metal M, an M oxide having a standard free energy of formation meeting the relation of $\Delta G_{M-O} > \Delta G_{TiO2}$; and heat-treating the resultant mixed powder at a temperature of 650-900° C. in a non-oxidizing atmosphere, thereby reducing the oxide of said metal M with Ti to provide the resultant fine particles of the metal M with $TiO_2$-based titanium oxide coating.

2. The method for producing fine, coated metal particles according to claim 1, wherein said metal M is Fe.

3. The method for producing fine, coated metal particles according to claim 1, wherein the oxide of said metal M is $Fe_2O_3$, and said Ti-containing powder is composed of TiC, the ratio of TiC to the sum of $Fe_2O_3$ and TiC being 30-50% by mass.

4. The method for producing fine, coated metal particles according to claim 1, wherein said fine, coated metal particles are further immersed in an aqueous solution containing an alkali source and then dried.

5. Fine metal particles coated with $TiO_2$-based titanium oxide, wherein the standard free energy of formation of an oxide of said metal meets the relation of $\Delta G_{M-O} > \Delta G_{TiO2}$; wherein the maximum peak of $TiO_2$ has a half-width of 0.3° or less in an X-ray diffraction pattern of the fine, coated metal particles; and wherein the intensity ratio of the maximum peak of $TiO_2$ to the maximum peak of the metal M is 0.03 or more.

6. The fine, coated metal particles according to claim 5, wherein said metal M is a magnetic metal.

7. The fine, coated metal particles according to claim 6, wherein said magnetic metal is Fe.

8. The fine, coated metal particles according to claim 7, having saturation magnetization of 50-180 A·m²/kg.

9. The fine, coated metal particles according to claim 7, having coercivity of 8 kA/m or less.

10. The fine, coated metal particles according to claim 7, wherein two or more fine Fe particles having an average particle size of 1 μm or less are contained in the $TiO_2$-based titanium oxide.

11. The fine, coated metal particles according to claim 7, wherein after 2.5 parts by mass of said fine, coated metal particles are immersed in 100 parts by mass of a physiological saline solution for 72 hours, the concentration of Fe ion in said physiological saline solution is 0.1 ppm or less.

12. The fine, coated metal particles according to claim 7, wherein after $0.2 \times 10^5$ PC-3 cells are added to 0.05 mL of PBS containing said fine, coated metal particles at a concentration of 2 mg/mL and incubated at 37° C. for 72 hours, the number of said PC-3 cells is 50% or more of that when incubated without adding said fine, coated metal particles.

13. The fine, coated metal particles according to claim 5, wherein said fine, coated metal particles have an average particle size d50 of 0.1-10 μm.

14. The fine, coated metal particles according to claim 5, wherein a ratio D/d50 of the average particle size D of said fine metal particles to the average particle size d50 of said fine, coated metal particles is 0.5 or less.

15. The fine, coated metal particles according to claim 5, having Ti oxide wires on the surface.

16. The fine, coated metal particles according to claim 5, wherein said metal M is Fe; and wherein after 25 mg of said fine, coated metal particles are immersed in 1 mL of an aqueous guanidine hydrochloride solution at a concentration of 6 M for 24 hours, the amount of Fe ion eluted is 100 mg/L or less.

17. The fine, coated metal particles according to claim 5, wherein the intensity ratio of the maximum peak of $TiO_2$ to the maximum peak of the metal M is 0.05 or more.

18. The fine, coated metal particles according to claim 17, wherein said metal M is Fe.

19. The fine, coated metal particles according to claim 18, having a saturation magnetization of 50-180 A·m²/kg.

20. The fine, coated metal particles according to claim 17, wherein said fine, coated metal particles have an average particle size of d50 of 0.1-10 μm.

* * * * *